Patented Feb. 6, 1934

1,946,159

UNITED STATES PATENT OFFICE 1,946,159

PROTEIN SOLUTION AND NEW PROTEIN DERIVATIVE AND PROCESS OF MAKING SAME

Charles Graenacher, Basel, Switzerland, assignor to Society of Chemical Industry in Basle, Basel, Switzerland No Drawing. Application January 4, 1932, Serial No. 584,757, and in Switzerland January 27, 1931

21 Claims. (Cl. 106—38)

This invention relates to new protein solutions, this term also comprising the protein-like degradation products of the proteins, to the application thereof for making various products chemically or mechanically, and to these products themselves.

The invention is an improvement in or modification of that of U. S. patent application Serial No. 563,218, filed September 16, 1931. In that patent application it is shown that the liquefied quaternary ammonium salts for themselves or in presence of suitable liquids have the surprising property of dissolving cellulose with the formation of solutions of more or less viscosity. Such liquids are above all anhydrous nitrogen-containing bases, such as anhydrous ammonia, or organic bases which do not decompose the quaternary ammonium salts, such as alkylamines (for example mono-, di- or trimethylamine), aniline, monomethylaniline, dimethylaniline, pyridine, picoline, lutidine, technical pyridine bases, mixtures of these compounds, etc.

Among the ammonium salts the halides, such as the chlorides, bromides, and iodides are the most suitable. There may also be used other salts, such as for example sulfates, nitrates or organic salts, such as formates, acetates, etc. Among the ammonium salts particularly those are further suitable which derive from halogen hydracid esters which contain up to 8 carbon atoms, such as benzyl chloride, chlorobenzyl chloride, ethyl, propyl or butyl chloride, or also from hexyl halides and octyl halides. Useful results may however also be obtained with other halides, such as for example with esters of halogen containing fatty acid, such as chloracetic ester or unsaturated products, such as allyl halides.

The present invention is based on the observation that proteins, this term also comprising the protein-like degradation products of the proteins, such as albumoses and peptones, also possess the property of dissolving in the aforesaid addition or ammonium compounds to yield solutions which contain the protein material in a very reactive form. According to the nature of the protein the dissolving temperature must be chosen more or less high. The solubility of the proteins may also be increased by partial degradation, which, as is well-known, may be performed in various manners, for example by preliminary treatment with acids, bases, sodium sulfide, and the like. The solutions may be applied to the production of formed articles or for the manufacture of further protein derivatives; for example, the dissolved proteins may be converted with extraordinary ease into new protein derivatives by treatment with acidylating agents.

It has also been discovered that the new protein solutions have the property of mixing in any desired proportion with the solutions of cellulose obtainable as described in U. S. patent application Serial No. 563,218 with the formation of homogeneous solutions capable of improved technical application. The mixed solutions may be applied for example, like the solutions described in the aforesaid specification, for the manufacture of formed objects, such as threads, films or artificial masses, which may differ completely both in their physical properties and in their behavior towards dyestuffs from the products of the aforesaid patent application. Intimate mixtures of derivatives of proteins and cellulose are furthermore obtained, for example, by treating the mixed solutions with acidylating agents.

Of course, mixtures may also be obtained by dissolving the cellulose and the protein simultaneously or successively in either order in an addition product of an alkylating agent and a tertiary base.

The following examples illustrate the invention, the parts being by weight:—

Example 1

Into a mixture of pyridine and benzyl-pyridinium chloride, prepared by heating together 100 parts of dry pyridine and 60 parts of benzylchloride at 100–110° C., are introduced 10 parts of dry, finely powdered casein and the mixture is stirred for about 1 hour at 95° C. Casein dissolves with the formation of a faintly milky solution. The casein solution thus obtained may be used as an addition to a cellulose solution obtainable as described in U. S. patent application Serial No. 563,218, whereby there may be made spun materials having modified physical and dyeing properties; or the casein in the form of its solution may be subjected very easily to further chemical reactions. Similar results are obtained with other proteins, for example, with an acidyl casein such as acetyl casein.

Example 2

10 parts of dry finely powdered casein are introduced, whilst stirring, into a mixture of 70 parts of ethyl pyridinium chloride and 35 parts of pyridine at the temperature of the water-bath and the mixture is maintained for 1 hour at this temperature with constant stirring.

The thick syrupy solution of the casein so obtained is allowed to cool to 80° C. and there are then introduced in small portions 10 parts of benzoyl chloride, stirring being continued. After the addition of each portion of benzoyl chloride, the mixture partially gelatinizes, but reverts to the form of a homogeneous viscous solution on further stirring. After the whole of the benzoyl chloride has been added the mass is stirred for a further hour at 90° C., whereby there is obtained a viscous solution which can be drawn into threads; by allowing the solution to flow into a suitable precipitating liquid, such as water, alcohol, etc., the benzoylated material must be precipitated in any desired coherent form, for example in the form of small ribbons, threads, etc.

*Example 3*

12 parts of linters and 1.5 parts of boiled-out tussore silk in the form of small clippings are simultaneously dissolved in a mixture of 150 parts of ethyl pyridinium-chloride and 75 parts of pyridine, the dissolution occupying about 2½ hours at 95° C. There is obtained a highly viscous solution of cellulose and silk; it is capable of being spun and yields a fibrous material which hardly differs from natural silk in its behaviour on dyeing.

It will be understood that the natural silk solution may also be made separately and only then added to the cellulose solution. So also there may be used instead of unaltered natural silk for producing a suitable solution one of its conversion products, obtainable in known manner by reprecipitation of the silk from a mineral acid or from a salt solution.

*Example 4*

50 parts of keratin (wool, feathers, hair, horn, etc.) are introduced at ordinary temperature into 500 parts of a solution of sodium sulfide ($Na_2S$) of 10 per cent strength and the mixture is allowed to stand for 24 to 36 hours with frequent stirring, whereby the keratin dissolves practically completely. After the solution has been filtered to remove undissolved matter, it is treated with acetic acid, whereby keratin-sulfolysate is precipitated in practically white form; it is filtered by suction, washed and dried and if necessary freed from sulfur by extraction with carbon bisulfide.

12 parts of the dry, very finely powdered partially degraded keratin (obtained as described in the preceding paragraph) are introduced at water-bath temperature into a mixture of 80 parts of ethylpyridinium-chloride and 40 parts of pyridine and the mixture is stirred at the aforesaid temperature until the protein has dissolved this may require from 4–16 hours depending upon the conditions under which it was prepared. There is obtained a solution which can be filtered clear; when the solution is poured into water, alcohol, etc., the protein is immediately precipitated, the solution may be used in admixture with a cellulose solution obtainable as described in U. S. patent application Serial No. 563,218.

If keratin is to be directly dissolved in the ethylpyridinium-chloride, the dissolving temperature must be raised to 150 to 180° C.

*Example 5*

There is prepared a solution of 20 parts of linters in a mixture of 200 parts of ethylpyridium-chloride and 100 parts of pyridine. To this cellulose solution are added at water-bath temperature 20 parts of the solution of a keratin prepared as described in Example 4, and the whole is stirred for a short time. There is obtained a mass which is capable of being spun and yields a fibrous material having besides altered physical properties, dyeing properties similar to those of wool.

What I claim is:—

1. A manufacture of solutions of proteins, this term comprising the protein-like degradation products of the proteins which still show the biuret reaction, by dissolving the proteins in a liquefied quaternary ammonium salt obtained by addition of a halogen hydracid ester of an alcohol containing not more than 8 carbon atoms to a tertiary amine of the pyridine series.

2. A manufacture of solutions of proteins, this term comprising the protein-like degradation products of the proteins which still show the biuret reaction, by dissolving the proteins in a liquefied quaternary ammonium salt obtained by addition of a halogen hydracid ester of an alcohol containing not more than 8 carbon atoms to a tertiary amine of the pyridine series, the dissolution being carried out in the presence of a liquid base containing nitrogen whose dissociation constant at 25° C. is smaller than $7.5 \times 10^{-4}$.

3. A manufacture of solutions of proteins, this term comprising the protein-like degradation products of the proteins which still show the biuret reaction, by dissolving the proteins in a solution, in a liquid base containing nitrogen whose dissociation constant at 25° C. is smaller than $7.5 \times 10^{-4}$, of a quaternary ammonium halide obtained by addition of a halogen hydracid ester of an alcohol containing not more than 8 carbon atoms to a tertiary amine of the pyridine series.

4. A manufacture of solutions of proteins, this term comprising the protein-like degradation products of the proteins which still show the biuret reaction, by dissolving the proteins in a solution, in a liquid base containing nitrogen whose dissociation constant at 25° C. is smaller than $7.5 \times 10^{-4}$, of a quaternary ammonium halide obtained by addition of an aralkyl halide containing not more than 8 carbon atoms to pyridine.

5. A manufacture of solutions of proteins, this term comprising the protein-like degradation products of the proteins which still show the biuret reaction, by dissolving the proteins in a solution, in pyridine, of the quaternary ammonium chloride obtained by addition of benzylchloride to pyridine.

6. A manufacture of solutions of proteins, this term comprising the protein-like degradation products of the proteins which still show the biuret reaction, by dissolving the proteins in a solution, in a liquid base containing nitrogen whose dissociation constant at 25° C. is smaller than $7.5 \times 10^{-4}$, of a quaternary ammonium halide obtained by addition of an alkyl halide containing at the most 5 carbon atoms to pyridine.

7. A manufacture of solutions of proteins, this term comprising the protein-like degradation products of the proteins which still show the biuret reaction, by dissolving the proteins in a solution, in a tertiary base consisting of a mixture of the technical pyridine base, of a quaternary ammonium halide obtained by addition of an alkyl halide containing at the most 5 carbon atoms to pyridine.

8. A manufacture of solutions of proteins, this term comprising the protein-like degradation products of the proteins which still show the biuret reaction, by dissolving the proteins in a solution, in a liquid base containing nitrogen whose dissociation constant at 25° C. is smaller than $7.5 \times 10^{-4}$, of the quaternary ammonium chloride obtained by addition of ethyl chloride to pyridine.

9. A manufacture of solutions of proteins, this term comprising the protein-like degradation products of the proteins which still show the biuret reaction, by dissolving the proteins in a solution, in pyridine, of the quaternary ammonium chloride obtained by addition of ethyl chloride to pyridine.

10. A manufacture of solutions of proteins, this term comprising the protein-like degradation products of the proteins which still show the biuret reaction, by dissolving the proteins in a solution, in ammonia, of the quaternary ammonium chloride obtained by addition of ethyl chloride to pyridine.

11. As composition of matter solutions containing, on the one part, quaternary ammonium salts obtained by addition of a halogen hydracid ester of an alcohol containing not more than 8 carbon atoms to a tertiary amine of the pyridine series, and, on the other part, proteins, this term comprising the protein-like degradation products of the proteins which still show the biuret reaction.

12. As composition of matter solutions of quaternary ammonium salts obtained by addition of a halogen hydracid ester of an alcohol containing not more than 8 carbon atoms to a tertiary amine of the pyridine series, and proteins, this term comprising the protein-like degradation products of the proteins which still show the biuret reaction, in liquid bases containing nitrogen whose dissociation constant at 25° is smaller than $7.5 \times 10^{-4}$.

13. Solutions of proteins, this term comprising the protein-like degradation products of the proteins which still show the biuret reaction, in a solution, in a liquid base containing nitrogen whose dissociation constant at 25° C. is smaller than $7.5 \times 10^{-4}$, of a quaternary ammonium halide itself obtained from a tertiary base of the pyridine series and an aralkyl halide containing not more than 8 carbon atoms.

14. Solutions of an aralkyl-pyridinium halide, obtained by addition of an aralkyl halide containing not more than 8 carbon atoms to pyridine, and of proteins, this term comprising the protein-like degradation products of the proteins which still show the biuret reaction, in a liquid base containing nitrogen whose dissociation constant at 25° C. is smaller than $7.5 \times 10^{-4}$.

15. Solutions of an aralkyl-pyridinium halide, obtained by addition of an aralkyl halide containing not more than 8 carbon atoms to pyridine, and of proteins, this term comprising the protein-like degradation products of the proteins which still show the biuret reaction, in a liquid base of the pyridine series whose dissociation constant at 25° C. is smaller than $7.5 \times 10^{-4}$.

16. Solutions of an aralkyl-pyridinium halide, obtained by addition of an aralkyl halide containing not more than 8 carbon atoms to pyridine, and of proteins, this term comprising the protein-like degradation products of the proteins which still show the biuret reaction, in pyridine.

17. Solutions of an alkyl-pyridinium halide, obtained by addition of an alkyl halide containing at the most 5 carbon atoms to pyridine, and of proteins, this term comprising the protein-like degradation products of the proteins which still show the biuret reaction, in a liquid base containing nitrogen whose dissociation constant at 25° C. is smaller than $7.5 \times 10^{-4}$.

18. Solutions of ethyl-pyridinium chloride and of proteins, this term comprising the protein-like degradation products of the proteins which still show the biuret reaction, in a liquid base containing nitrogen whose dissociation constant at 25° C. is smaller than $7.5 \times 10^{-4}$.

19. Solutions of ethyl-pyridinium chloride and of proteins, this term comprising the protein-like degradation products of the proteins which still show the biuret reaction, in pyridine.

20. Solutions of ethyl-pyridinium chloride and of proteins, this term comprising the protein-like degradation products of the proteins which still show the biuret reaction, in ammonia.

21. Solutions of ethyl-pyridinium chloride and of proteins, this term comprising the protein-like degradation products of the proteins which still show the biuret reaction, in aniline.

CHARLES GRAENACHER.